June 19, 1928.
A. A. LANG
1,674,048
DUSTING APPARATUS
Filed May 17, 1924
2 Sheets-Sheet 2
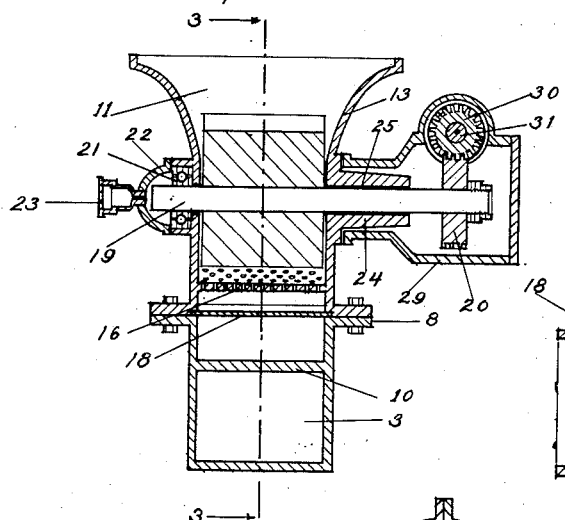
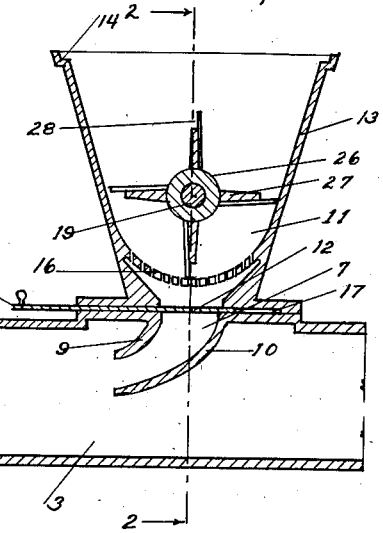
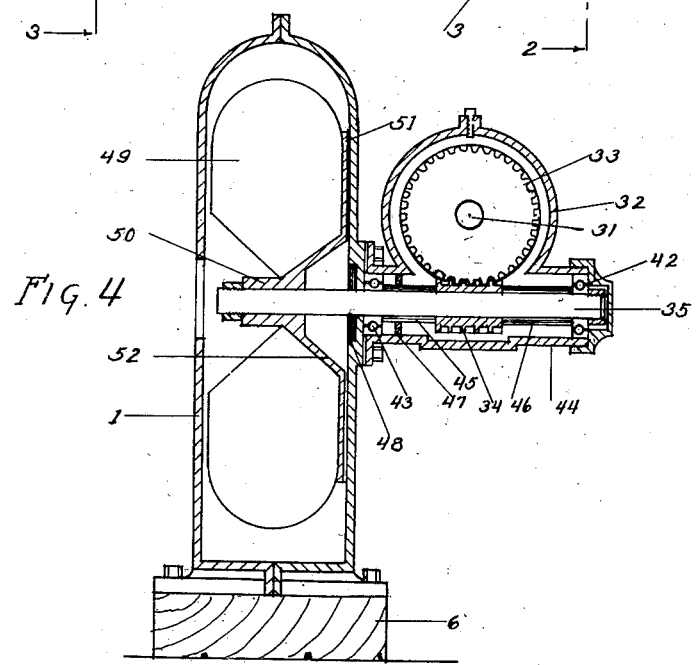
Inventor
Alfred Allen Lang
By Everett J. Peck
Attorney Patented June 19, 1928.

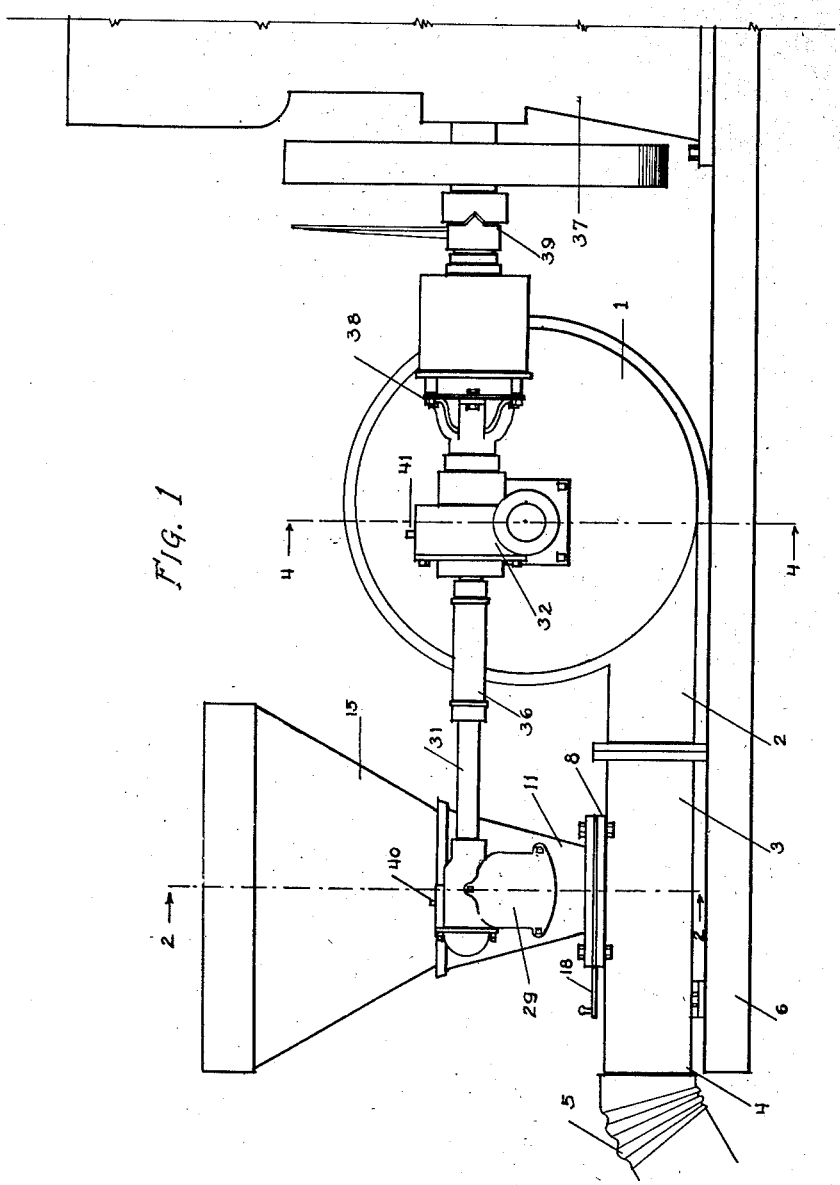

1,674,048

UNITED STATES PATENT OFFICE.

ALFRED ALLEN LANG, OF WINTER HAVEN, FLORIDA, ASSIGNOR TO THE VAN FLEET COMPANY, OF FLORENCE VILLA, FLORIDA, A CORPORATION OF FLORIDA.

DUSTING APPARATUS.

Application filed May 17, 1924. Serial No. 714,082.

This invention relates to dusting apparatus; and more particularly to a class of portable powder dusters commonly used to throw a cloud of finely powdered sulphur, or other substance having insecticidal or fungicidal properties, into, through and about the foliage and fruit of orchard trees.

In order that the substance used, whatever its nature, may accomplish effectively the end intended, it must be capable of drifting lightly and diffusing itself completely throughout the space delimited by the contour of the tree or shrub operated upon. This prime necessity renders imperative the use of dusting material in its most finely comminuted form. But when so reduced the particles of most substances have a strong tendency to adhere and lump together. One of the objects of this invention is, therefore, to provide simple and practical means for keeping the mass of powder gently agitated, for crushing any hard lumps that may be present, and for feeding the dust continuously to and in the direction of movement of a strong blast of air. A further object is to provide dusting apparatus in which the rotor of the blower or fan and a rotative dust agitator may be effectively geared together and to a common source of power by means of positive driving elements, rather than such drawing or dragging elements as belts and chains. Other objects will be in part obvious and in part pointed out hereinafter.

This invention accordingly consists in the novel construction, arrangement of parts, and combinations of elements shown in the embodiment thereof herein described, and the scope of the application thereof more particularly pointed out in the claims.

The structural features will be made clear by reference to the drawings, wherein like characters of reference indicate corresponding parts throughout the different views, and in which Fig. 1 is a side elevation of so much of my apparatus as is needed to show my present invention.

Fig. 2 is a cross-section taken on lines 2—2 of Figures 1 and 3.

Fig. 3 is a cross-section taken at right angles to that of Figure 2, on line 3—3 of said figure.

Fig. 4 is a cross-section taken on line 4—4 of Figure 1.

Referring to the drawings it will be seen that a blower or fan 1 is connected at its outlet 2 with an ejector-conduit 3, which in turn has its outlet attached to a flexible distributing-hose 5. These units are rigidly supported upon a platform 6, the latter usually mounted on wheels and provided with means for hitching to a team of draught-animals, which locomotive features are not herein shown. The upper side of the conduit 3 is provided with an opening or dust inlet 7, surrounded by a flange 8. Depending from the edges of the inlet 7 are the baffle walls 9 and 10 which curve outwardly towards the outlet of the conduit, and extend laterally entirely across the upper portion of said conduit. These walls constitute an ejector-nozzle, by means of which dust may be drawn into the blast of air passing through said conduit, as hereinafter described.

A dust-receptacle 11, having a flanged outlet 12 registering with the opening 7 of conduit 3, is superimposed upon said conduit and securely fastened thereto. This receptacle, which is preferably rectangular in cross-section, has upwardly diverging walls 13, terminating as a lipped opening 14 at the top, in which opening is removably secured a hopper 15 capable of receiving the contents of a sack of dusting material. An upwardly concave bottom wall 16, having a substantially cylindrical contour, unites the four side walls of the receptacle adjacent the outlet thereof, said bottom wall being perforated for the precipitation of dust from said receptacle. The lower flanged surface of the receptacle is recessed as at 17 to provide sliding space for the dust-valve 18, which rests upon the upper surface of the conduit flange 8. A transverse horizontal shaft 19, passing through openings in the side walls of the receptacle 11, has fixed at one end a worm 20 and is itself supported adjacent its opposite end by a ball-bearing 21, over which extends the cap 22. A grease-cup 23 provides lubrication for the said bearing. Said shaft is further supported by the elongated bearing 24 which forms an integral part of the receptacle wall and is provided with an antifriction bushing 25. Tightly secured to the shaft 19 and disposed between the side walls of the receptacle is an agitator, comprising a paddle-wheel like member having a hub

26 and outwardly extending blades 27. Each of said blades has secured to a side thereof a sheet of leather 28, extending far enough beyond the edge of the blade to wipe the perforated bottom 16 when the shaft 19 is rotated. A gear-casing 29, fastened to the side of the receptacle, surrounds the end of the shaft 19, the worm 20 and a worm-gear 30, the said gear meshing with said worm and being mounted upon a counter-shaft 31.

Counter-shaft 31 is rotatably supported in any preferred manner within the gear-casing 29. Another gear-casing 32, fastened to the side of the blower 1, provides a second support for said counter-shaft and encloses the worm gear 33, carried by said shaft, and also the worm 34, which is itself rigidly mounted upon the blower shaft 35. Counter-shaft 31 is provided with a flexible coupling 36 located between the two said worm-gears; and to the right of the blower, as shown in Fig. 1, is connected to the shaft of any suitable engine or motor by means of the universal coupling 38 and the releasable clutch mechanism 39. As the said clutch and couplings form no novel part, per se, of my dusting apparatus, these parts are not shown in any particularity of detail; and the same may be said regarding the various bearings designated herein, although ball-bearings are preferably employed. Exception should be made in the case of the agitator bearing 24 which is designed to prevent oil, contained within the casing 29 from being carried over into the dust receptacle, where it might cause considerable trouble. Perforated bosses are indicated at 40 and 41 upon the upper surfaces of the respective gear-casings, by means of which oil may be introduced for the lubrication of the gears and bearings enclosed thereby.

Fan shaft 35 revolves in bearings 42 and 43 disposed at opposite ends of the transverse portion 44 of gear-casing 32. Sleeves 45 and 46 fitting loosely about shaft 35 are interposed between the ends of the worm 34 and the bearings 42 and 43 respectively. The said bearings are disposed in contact with the ends of the casing, so serve to take up the thrust of the gearing in either direction. A leather or felt annular washer 47, lying between the sleeve 45 and the wall of the casing, serves to cut off any excess of oil traveling along the shaft towards the bearing 43, but permits passage of sufficient oil for lubrication. A second felt washer retained within a recessed portion of the fan-housing wall, as at 48, also serves as a stop for oil. The fan itself which comprises a plurality of blades 49 attached to a hub 50 and to a single flange 51, the latter flaring out from said hub at the inner end thereof, is especially designed to reduce to a minimum any tendency to form a vacuum about the point where the shaft enters the fan-housing; and thus prevent oil from being sucked through into said housing. This is accomplished by enlarging said hub, as at 52, along conical lines from about its center to its junction with the flange 51. This enlargement, which is hollow, gives greater strength to the fan without adding much to the weight thereof; and, by reason of the concavity therein, the fan has not nearly so great a tendency to form a vacuum about its shaft as when it presents a solid wall in opposition to the wall of the housing.

The operation of dusting is carried out as follows:—

The apparatus having been brought into operative position with respect to the tree or shrub to be dusted, the dust valve 18 being closed, the engine is started and the clutch thrown in to rotate the counter-shaft. A blast of air is now driven through the conduit 3 by the blower and a strong suction set up at the end of the ejector-nozzle 9—10. When the dust-valve is opened, the finely powdered contents of the dust-receptacle is drawn through the perforated bottom thereof, thoroughly mixed with the air blast in the conduit 3 and then discharged from the distributing-hose in a violently agitated stream, immediately spreading out in all directions as a cloud which filters through the tree, leaving a fine accumulation of dust upon all surfaces of leaf, fruit and branch. The density of the dust cloud may be very accurately regulated and controlled by moving the dust-valve in or out to provide more or less opening at the outlet of the receptacle. At the same time, the agitator is turning within the receptacle, positively forcing the contents against and through the perforated bottom thereof. If lumps are present they are effectively crushed and a uniformly fine condition maintained in the material, whereby the continuous ejection and wide diffusion thereof is assured. The inclination of the walls of the hopper and receptacle is sufficient to provide gravity feed of material down to and about the agitator blades, the normal vibration of the entire apparatus considerably aiding this process.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed as new and what is desired to be secured by United States Letters Patent is:—

1. In apparatus of the character described, in combination, an agitator shaft provided with a worm-gear; a blower shaft also provided with a worm-gear; a drive shaft provided with a pair of pinions disposed in operative engagement respectively with the two said worm-gears; said gearing being enclosed in oil-tight casings and adapted to give to the agitator shaft a relatively slower, and to the blower shaft a relatively faster speed than the speed of the drive shaft; and means for imparting rotation to said drive shaft.

2. In apparatus of the character described, in combination, a blower and a dust receptacle having their interiors connected to discharge into a common conduit; an oil-tight gear-casing rigidly secured to said blower, a second oil-tight gear-casing rigidly secured to said dust receptacle; a drive shaft, having a pair of drive pinions located one in each of said gear casings; and a fan shaft and an agitator shaft operatively geared to the said pinions within their respective casings.

3. In apparatus of the character described, in combination, a blower provided with a rotatable fan-shaft and an air outlet, a dust-receptacle provided with a rotatable agitator shaft and a dust outlet, a conduit connecting both said outlets, and a counter-shaft positively connected by worm-gearing with both said shafts.

In witness whereof, I have signed my name to this specification.

ALFRED ALLEN LANG.